US008682940B2

(12) United States Patent
Van de Merwe et al.

(10) Patent No.: US 8,682,940 B2
(45) Date of Patent: Mar. 25, 2014

(54) OPERATING A NETWORK USING RELATIONAL DATABASE METHODOLOGY

(75) Inventors: Jacobus E Van de Merwe, New Providence, NJ (US); Xu Chen, Ann Arbor, MI (US); Yun Mao, Jersey City, NJ (US); Zhuoqing M Mao, Ann Arbor, MI (US)

(73) Assignee: AT&T Intellectual Property I, L. P., Atlanta, GA (US)

( * ) Notice: Subject to any disclaimer, the term of this patent is extended or adjusted under 35 U.S.C. 154(b) by 61 days.

(21) Appl. No.: 12/830,154

(22) Filed: Jul. 2, 2010

(65) Prior Publication Data

US 2012/0005243 A1    Jan. 5, 2012

(51) Int. Cl.
*G06F 17/30* (2006.01)

(52) U.S. Cl.
USPC .......................................... 707/812; 709/203

(58) Field of Classification Search
USPC ............ 707/603, 999, 10, 758, 792; 709/203, 709/224, 226, 228; 370/352, 353, 254
See application file for complete search history.

(56) References Cited

U.S. PATENT DOCUMENTS

| 5,307,484 | A  | * | 4/1994  | Baker et al. .............................. 1/1 |
| 6,477,559 | B1 | * | 11/2002 | Veluvali et al. ................ 718/101 |
| 6,718,535 | B1 |   | 4/2004  | Underwood |
| 6,901,440 | B1 | * | 5/2005  | Bimm et al. ................... 709/223 |
| 7,043,494 | B1 | * | 5/2006  | Joshi et al. .............................. 1/1 |
| 7,100,195 | B1 |   | 8/2006  | Underwood |
| 7,143,107 | B1 | * | 11/2006 | Nebres, Jr. ..................... 707/603 |
| 7,216,126 | B2 | * | 5/2007  | Choy ............................ 707/785 |
| 7,523,127 | B2 | * | 4/2009  | Chen-Wright et al. ................ 1/1 |
| 7,558,847 | B2 |   | 7/2009  | Strassner |
| 7,689,579 | B2 | * | 3/2010  | DeMesa et al. ......... 707/999.102 |
| 7,987,228 | B2 | * | 7/2011  | McKeown et al. ............. 709/202 |
| 2005/0021766 | A1 | * | 1/2005  | McKeowen et al. .......... 709/228 |
| 2005/0120030 | A1 | * | 6/2005  | Varpela et al. ................ 707/100 |
| 2007/0061397 | A1 | * | 3/2007  | Gregorat et al. .............. 709/203 |
| 2007/0153771 | A1 | * | 7/2007  | Doradla et al. ................ 370/352 |
| 2008/0071793 | A1 | * | 3/2008  | Cohen et al. ..................... 707/10 |
| 2008/0222290 | A1 | * | 9/2008  | Le Moigne et al. ........... 709/226 |
| 2008/0250057 | A1 | * | 10/2008 | Rothstein et al. ............. 707/102 |
| 2009/0018996 | A1 |   | 1/2009  | Hunt et al. |
| 2011/0072028 | A1 | * | 3/2011  | Rousseau ...................... 707/758 |
| 2011/0125802 | A1 | * | 5/2011  | Van der Merwe et al. .... 707/792 |
| 2011/0191303 | A1 | * | 8/2011  | Kaufman et al. ............. 707/684 |
| 2011/0208759 | A1 | * | 8/2011  | Zellweger ..................... 707/754 |

OTHER PUBLICATIONS

Caldwell, et al. The Cutting Edge of iP Router Configuration, Proc. 2nd ACM Workshop on Hot Topics in Networks, Nov. 20, 2003, Cambridge, Mass.

* cited by examiner

*Primary Examiner* — James Trujillo
*Assistant Examiner* — Thong Vu
(74) *Attorney, Agent, or Firm* — Scott P. Zimmerman, PLLC

(57) ABSTRACT

The disclosed technology involves the use of relational databases in conjunction with declarative language and network-wide, database abstractions to manage and operate networks. The data model creates a logically centralized database abstraction and access point for managing data relevant to network management. Exemplary managed data includes router configurations, network status and provisioning data. This information resides in a single database system which is tightly integrated with the operational network. Transactional write operations are used to change network configurations, and enforce constraints to detect and prevent policy violations during operation. In accordance with one aspect of the disclosed technology, a network operation is implemented by means of a series of database commands—read and/or write—from and to database view tables.

11 Claims, 13 Drawing Sheets

201 — R0  EnabledIntf (ifId), rId) :- TRouterIntf (ifId, rId),
            CInerface (ifId, "enabled");

202 — R1  OspfRoute (rId, prefix) :- EnabledIntf (ifId, rId),
            CIntfPrefix (ifId, prefix),
            CIntfOspf (ifId);

203 — R2  OspfRoute (rId1, prefix) :- OspfRoute (rId2, prefix),
            TIntfConnection (ifId1, rId1, ifId2, rId2),
            EnabledIntf (ifId1, rId1), CIntfOspf (ifId1),
            EnabledIntf (ifId2, rId2), CIntfOspf (ifId2);

FIG. 6

```
601 — def setupIp ( rId1, ifId1, rId2, ifId2, ip1, ip2 ):
  602 — with db.begin_txn( ):
    603 — CIntfPrefix.update ( id=ifId1, prefix+ip1 )
    604 — CIntfPrefix.update ( id=ifId2, prefix=ip2 )
    605 — db.flush( )
    606 — assert ( SPing (rId1, ip1, ip2, rtt ), rtt>0 )
    607 — db.commit ( ) # optional
```

FIG. 8

Require: A list of insertion attempts, $L = \{(V_i, t_i)\}$; current database state, $DB$; View declarations, $VD$;

801 — 1:   $s.actions \leftarrow \{\}, s.toResolve \leftarrow L$
802 — 2:   $Q \leftarrow \{\}$, $heappush\,(Q,s)$
803 — 3:   while $Q$ *is not empty* do
804 — 4:     $s \leftarrow heappop(Q)$
805 — 5:     $search[s] \leftarrow True$
806 — 6:     continue *if* $\exists sol \in solutions \wedge sol.action \subset s.action$
807 — 7:     $left \leftarrow \{\}$
808 — 8:     for $(V,t) \in s.toResolve$ do
809 — 9:       if $(V,t) \notin combine\,(DB, s.actions)$ then
810 — 10:         $left \leftarrow left \cup \{(V,t)\}$
811 — 11:       end if
812 — 12:     end for
813 — 13:     if $left == \{\}$ then
814 — 14:       $solution \leftarrow solution \cup \{s\}$
815 — 15:     else
816 — 16:       $res \leftarrow resolve\,(DB, VD, s.actions, left)$
817 — 17:       for $(newActions, newToResolve) \in res$ do
818 — 18:         $s' \leftarrow (s.action \cup newActions, newToResolve)$
819 — 19:         continue if $s'$ violates constraints
820 — 20:         $heappush(Q, s')$
821 — 21:       end for
822 — 22:     end if
823 — 23:   end while
824 — 24:   return solution

FIG. 10

1011 —— RS1 SNLink(lrId1,ifId1,lrId2,ifId2,connId) :- CPrLr(rId1,lrId1), CPrLr(rId2,lrId2), TSNLocation(rId1,loc1), TSNLocation(rId2,loc2), loc1 != loc2, ActiveVplsLink(lrId1,ifId1,lrId2,ifId2);

1012 —— RS2 SNLink(lrId1,ifId1,lrId2,ifId2,connId) :- CPrLr(rId1,lrId1), CPrLr(rId2,lrId2), TSNLocation(rId1,loc1), TSNLocation(rId2,loc2), loc1 == loc2, rId1 != rId2, TSNDevice(swId, loc1, "switch"), ActiveVlanLink(swId,lrId1,ifId1,lrId2,ifId2);

OPERATING A NETWORK USING RELATIONAL DATABASE METHODOLOGY

FIELD

The disclosed technology, in one embodiment, relates generally to network management, including network operation, using relational database methodology.

BACKGROUND

Network management and operation arguably continues to thwart modernization attempts by the networking community. There are a number of reasons for this problem. First, network management is inherently difficult because of the scale, distributed nature and increasing complexity of modern communication networks. Second, network management tools and practices have not kept up with the ever-evolving and complex nature of the networks being managed. Third, and perhaps most importantly, current network management approaches fail to capture and utilize, in a systematic fashion, the significant domain expertise (from vendors, service providers and protocol designers), which enables the continued operation of the network.

In a typical large Internet service provider setting, hundreds or thousands of network devices are distributed across vast geographic distances, and their configurations collectively determine the functionality provided by the network. The protocols and mechanisms that realize such network functionality often have complex dependencies that have to be satisfied for correct operations. Such dependencies are often not precisely defined, or at least not expressed in a systematic manner. When they are violated through misconfigurations, software bugs, or equipment failures, network troubleshooting becomes an extremely difficult task.

Despite these evolving complexities, network management operations still largely rely on fairly rudimentary technologies. With few exceptions, network configuration management is still performed via archaic, low-level command line interfaces (CLIs). Vendors describe protocol dependencies and network-wide capabilities in device manuals or other technical documents. Network engineers interpret these vendor documents and in turn produce service provider documentation, which describes in prose how such services might be realized. Similarly, planned-maintenance activities rely on the experience of human operators and their ability to interpret and follow procedures documented by domain experts to prevent undesired side effects. In short, current network management methodology depends on the knowledge base of domain experts being captured in documents meant for human consumption and then derives, from this captured knowledge, systems and procedures to ensure that the correct document be consulted and followed to perform network operations.

In cases where network operations have progressed beyond the capacity of human interpretation and manual execution of procedures, tools are used to attempt to automate the procedures that a human operator would have performed, and/or reverse engineer the protocol and network dependencies that prevail in an existing network. For example, sophisticated network configuration management tools capture the actions of human experts for subsequent automation. Existing fault and performance management practices involve, in part, reverse engineering protocol actions and dependencies.

SUMMARY

The disclosed technology involves the use of relational databases in conjunction with declarative language and network-wide, database abstractions to manage and operate networks. The data model creates a logically centralized database abstraction and access point for managing data relevant to network management. Exemplary managed data includes router configurations, network status and provisioning data. This information resides in a single database system which is tightly integrated with the operational network. Transactional write operations are used to change network configurations, and enforce constraints to detect and prevent policy violations during operation. In accordance with one aspect of the disclosed technology, a network operation is implemented by means of a series of database commands—read and/or write—from and to database view tables.

In an embodiment of the disclosed technology, traditional relational database technologies are utilized, and enhance the concepts of derived views, updatable views, and transaction management under a distributed database context. Additionally, advanced network management primitives, like network-wide reasoning, automated configuration, and atomic network operations, are enabled with declarative rules and transaction support. These new primitives elevate the level of abstraction exposed to network operators, significantly reduce their manual involvement, and provide stronger guarantees to maintain a healthy network-wide state. Embodiments of the disclosed technology can work with off-the-shelf, production-grade devices and indeed such capability provides additional benefits in network management.

One aspect of the disclosed technology involves building a database interface to provide a network-wide abstraction for network management and operations. On top of this abstraction, a declarative query language allows domain knowledge from different stakeholders and role players to be captured within the same framework in a systematic manner, thus allowing network-wide reasoning to be applied to network management tasks.

Aspects of the disclosed technology take an integrated approach in which the domain expertise of different stakeholders and role players can be systematically captured in a unifying framework, and where protocol and network dependencies can be automatically taken into account by operational tools without the need for reverse engineering. Specifically, the disclosed technology envisions an environment where: (i) vendors provide rules to capture not only the device-specific capabilities of their products, but also network-wide protocol configuration and dependency details; (ii) service providers use the same framework to define how these vendor capabilities should be combined to realize the specific services offered by the provider; (iii) network management and operational procedures, likewise, are defined within the same framework and directly benefit from previously defined vendor and provider specific rules and constraints; and (iv) fault and performance management tools are developed within the same framework, reducing the need to reverse engineer dependencies and protocol interactions.

In one embodiment of the disclosed technology, a network is operated by populating a relational database with data representing characteristics associated with components of the network; implementing a database query to define a view table; and writing data to the view table, the data representative of a change in a characteristic associated with a component of the network.

Another embodiment of the invention is a network comprising: at least two network devices; a memory device with a memory position associated with a cell of at least one view table of a relational database, and with data in the memory position associated with at least one characteristic of at least one network device; a data entry device for entering data into the memory position; a communication device for communicating information associated with a change in the data in a memory position associated with the at least one characteristic of the at least one network device, and the at least one network device adapted to change a characteristic of the at least one network device based on the communicated information.

Yet another embodiment of the invention is a computer readable storage medium encoded with computer executable instructions which, when executed by a computer, implements the steps of: populating a relational database with data representing characteristics associated with components of the network; implementing a database query to define a view table; and writing data to the view table, the data representative of a change in a characteristic associated with a component of the network.

BRIEF DESCRIPTION OF THE DRAWINGS

FIG. 6 is a representation of pseudo-code that demonstrates basic usage of the transaction primitive.

FIG. 8 is a representation of an algorithm to find all solutions for a group-insert request.

FIG. 10 is an exemplary representation of rules for connectivity establishment in SNet.

DETAILED DESCRIPTION

Overview

Figures 1, 2:
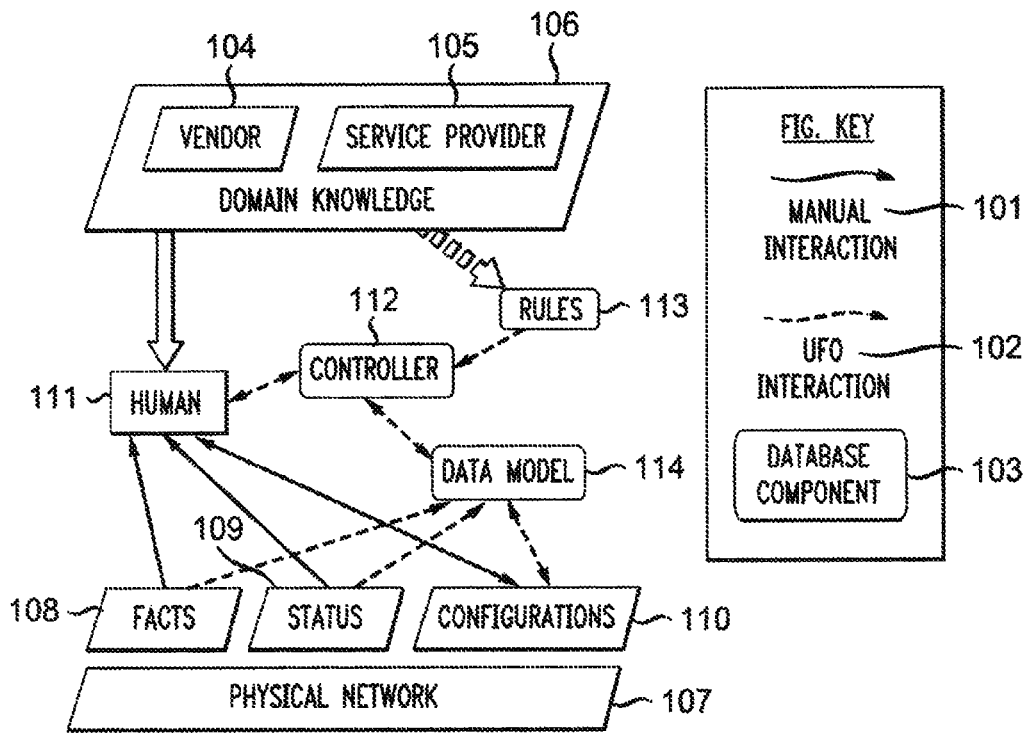
FIG. 1 is a schematic representation of the operation of a network comparing conventional human interactions with an embodiment of the disclosed technology.
FIG. 2 is an exemplary listing of rules for OSPF (Open Shortest Path First protocol) route learning.

In current approaches to network management, human operators play a central role by absorbing a tremendous amount of domain knowledge and directly interacting with the underlying physical networks. (We use the term network management to include oversight activities, the implementation of changes in the network, and the operation of the network. At times, the terms operation and management may be used interchangeably) In particular, network operators need to mentally tie together (i) the network device inventory (facts), (ii) the configuration on network devices (configurations), (iii) the observed network running status (status), (iv) network-level functionalities, and (v) the network-specific constraints. For example, to realize a distributed network functionality, an operator is required to effect configuration changes to multiple devices based on the available devices in the inventory, without violating network-specific constraints, and finally to verify the network running status. Even with advanced management tools or home-brewed scripts, significant manual involvement is still required for reasoning, coordination, verification, etc. Unfortunately, the domain expertise in network management is not captured in a systematic manner for the purpose of re-use and automation. Thus the management practice is inherently limited by human operators' capability to interpret, reason, and execute.

One aspect of the disclosed technology involves the use of relational databases in conjunction with declarative language and network-wide, database abstractions to manage and operate networks. Transactional write operations are used to change network configurations, and enforce constraints to detect and prevent policy violations during operation. Network-wide reasoning, automated configuration, and atomic network operations, are enabled with declarative rules and transaction support. Such primitives elevate the level of abstraction exposed to network operators, significantly reducing their manual involvement, and provide stronger guarantees to maintain a healthy network-wide state. In what immediately follows, we provide an overview of databases, declarative systems and network management as used in the disclosed technology. This is followed by an extended more detailed discussion of various aspects of the disclosed technology and specific embodiments.

Databases

Database technologies may be used in networks, for example, to store router configuration snapshots, and one can write queries to audit and perform static analysis of existing configurations in an offline fashion. However, from a network operator's perspective, the database is read only and is not necessarily consistent with live configurations. In contrast, an embodiment of the disclosed technology provides a unifying database abstraction that integrates router configurations, live network status and provisioning data. As opposed to a postmortem support tool, this embodiment provides transactional write operations to change network configurations, and enforces constraints to detect and prevent policy violations during operation.

To realize the database abstraction of this embodiment, techniques such as recursive query optimization, distributed transaction processing, and updatable materialized views may be used. An embodiment of the disclosed technology integrates these features with unique optimizations customized for network management and operations.

Declarative Systems

In an embodiment of the disclosed technology declarative language is used for describing domain knowledge, such as dependencies and restrictions among network components, as opposed to implementing protocols for execution or simulation. As a stand-alone management plane, an embodiment of the disclosed technology orchestrates network devices in a declarative fashion, while not requiring the existing routers to be modified.

Network Management

An embodiment of the disclosed technology allows a concise and compact representation of domain knowledge using declarative rules, which, for example, can be specified by service providers or inherited from vendors. The network-wide reasoning and constraint checking performed using the disclosed technology are automated with well-defined transactional semantics. Additionally, the disclosed technology fulfills the functionalities of the decision and dissemination planes. Characteristics of specific embodiments of the disclosed technology include features, and combination of features, such as distributed recursive query processing, breadth-first-search based constraint solving algorithm, and transactional semantics with constraint enforcement. Another characteristic of specific embodiments of the disclosed technology involves the use of rules for representing domain knowledge in network management.

An Embodiment

An embodiment of the disclosed technology represents an effort to alleviate at least some of the responsibility of human network operators and managers. This embodiment reflects a holistic network management philosophy that emphasizes: (i) systematically capturing both protocol dependencies and expert knowledge; (ii) allowing this knowledge base to be used by operators and network management tools in a network-wide (cross-device) manner without violating any dependencies; and (iii) enabling automation with minimal human involvement. In what follows, we present the framework of an embodiment of the disclosed technology that satisfies these requirements and then introduce four network management primitives that are built on top of the framework.

Framework

FIG. 1 depicts components of an embodiment of the disclosed technology, as well as conventional network management practices. As shown in the key to FIGS. 1, at 101, 102, and 103 rounded rectangles represent database components, solid lines represent manual interactions and dotted lines represent database interactions. In the FIG, 106 represents domain knowledge, comprising knowledge provide by vendors, 104, and knowledge provided by service providers, 105. The physical network, 107, includes facts, 108, network status, 109, and configurations, 110. As discussed above, in conventional network management, a human, 111, acts as the interface between the physical network, 107, and the domain knowledge, 106, with the attendant limitations discussed above. As discussed in detail below, in an aspect of the disclosed technology, the interaction between the domain knowledge and the physical network is accomplished in large part by relational database methodology, including without limitation, a data model, 114, rules, 113, and a controller, 112. These three components are discussed further, in turn, immediately below.

Data model: The data model creates a logically centralized database abstraction and access point for managing data relevant to network management. This includes router configurations, network status and provisioning data. This information resides in a single database system which is tightly integrated with the operational network. There may be three types of base tables: (i) "Regular tables" that store fact-related data that naturally fit into a conventional database (e.g., MySQL™), such as the list of routers, physical connectivity between router interfaces, and customer prefix list of routers, physical connectivity between router interfaces, and customer prefix assignments; (ii) "Config tables" that store the live network configurations, for example, router states that are nonvolatile and persistent across reboots, such as IP addresses, protocol-specific parameters, interface administrative status, etc.; and (iii) "Status tables" that represent the volatile aspect of device/network state, such as protocol running status, routing table entries, CPU load, or other dynamic status relevant to network health, for example, ping results between routers. Reflecting dynamic network status, these tables, in one embodiment, may be read only, with table entries generated on-demand from traditional management interfaces, such as CLI and SNMP MIBs.

By integrating all network states in a single database abstraction, this embodiment of network management is complete, as the three types of tables capture all the information and functionalities necessary to perform operational procedures. On the other hand, this abstraction enables database techniques, such as query and transaction processing techniques, to raise the level of abstraction and simplify management tasks. Further below, we discuss a specific implementation of such a unifying abstraction to support off-the-shelf commercial devices with no impact to their performance.

Rules: Network management knowledge is represented as rules in the form of a declarative query language. In this embodiment, these rules describe network protocol behavior, policies, and dependencies, and when executed they help bridge high level network functionalities with low-level access mechanisms. They can be contributed by device vendors describing network device capabilities and features, and customized by service providers to meet their specific demand. Notably, such knowledge is currently stored in various types of text documents, which are meant for human consumption and later manual fiddling. In contrast, an aspect of the disclosed technology allows concise and accurate representations using a small number of rules. In fact, in the future, device vendors might prefer declarative rules over text-based documents to facilitate more automated network management. More importantly, querying these rules can be automated by the controller and therefore this methodology naturally scales with expanding knowledge base and network size, as opposed to a manual process, which is inherently limited by human capability.

Controller: As the "brain" of the disclosed technology, the controller applies the rule-based domain knowledge to the network state stored in the data model, thereby automating network management tasks. From the database perspective, it offers the capabilities of recursive query processing, global constraint enforcement, updatable views, and distributed transaction management. From the network management perspective, these capabilities are the enabling techniques for many new network management primitives, including 1) network-wide reasoning, 2) misconfiguration prevention, 3) configuration automation, and 4) atomic network operations. Further below, we discuss those features of the controller in the context of the corresponding network management primitives they enable.

Network-Wide Reasoning—Reasoning about network-wide properties is an essential part of network management. For example, if a network operator needs to know if an MPL-SNPN instance is configured correctly or what services might be impacted if a particular loopback interface is shut down, the operator needs to distill a high-level understanding of the network functionalities from low-level information sources. Handling these questions incorrectly is likely to cause misconfigurations or even network-Wide outages. Unfortunately, this reasoning procedure is difficult because of the distributed devices involved, the device-centric interfaces accessed, and, most importantly, the extensive domain knowledge required.

An embodiment of the disclosed technology achieves the primitive of automated network-wide reasoning through distributed recursive queries which are defined by a set of rules on top of the data model. The rules may be written in a declarative language based on, for example, Datalog™. From a database perspective, each rule defines a derived view table (or view in short) as the result of a database query. The view may depend on the data from several base tables and/or other views.

In Datalog, each rule is defined as rule_name rule_head:-rule_body;. The rule head contains exactly one predicate as the view being defined. The rule body contains predicates and Boolean expressions that derive the view. A rule is intuitively read as "if everything in the body is true, then the head is true." Datalog, with stratified negation as a query language, demonstrates conciseness in representing recursive queries and negations and tight connection to logic programming. However, other query languages, such as SQL™ and XQuery™, perhaps augmented with features, such as recursion, are also suitable to our framework.

In the listing shown in FIG. 2, a simple example is used to demonstrate how the knowledge regarding OSPF (Open Shortest Path First protocol) route learning can be written as three rules. In FIG. 2, Rule R0, at 201, is a simple rule that defines a view, EnabledIntf, for identifying the list of enabled interfaces in the network. It joins a regular router interface inventory table TRouterIntf and interface configuration table CInterface and selects the interfaces that are configured as "Enabled".

Rule R1, at 202, captures how a router imports local OSPF routes, by stating that if an interface on a router is administratively enabled (as in EnabledIntf) and configured as OSPF-enabled (as in CIntfOspf), then the prefix of its IP address is in the OSPF routing table of the router (OspfRoute).

Rule R2, at 203, expresses how routes are propagated across routers, by stating that any OspfRoute on router rId2 can populate to router rId1 if they have directly connected interfaces and both are up and OSPF-enabled. Note that R2 is both distributed and recursive as the query touches multiple devices (i.e., distributed) and the rule head is part of the rule body (i.e., recursive).

Figure 3:
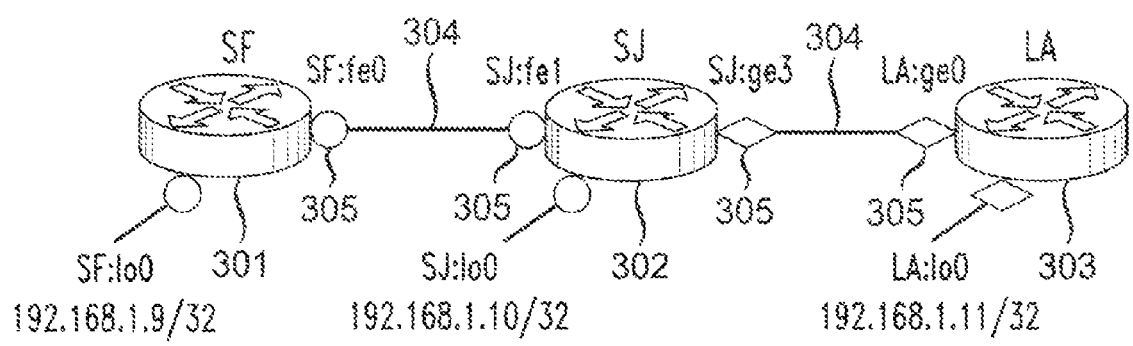
FIG. 3 is a schematic representation of a small network with three routers.
Figure 4:
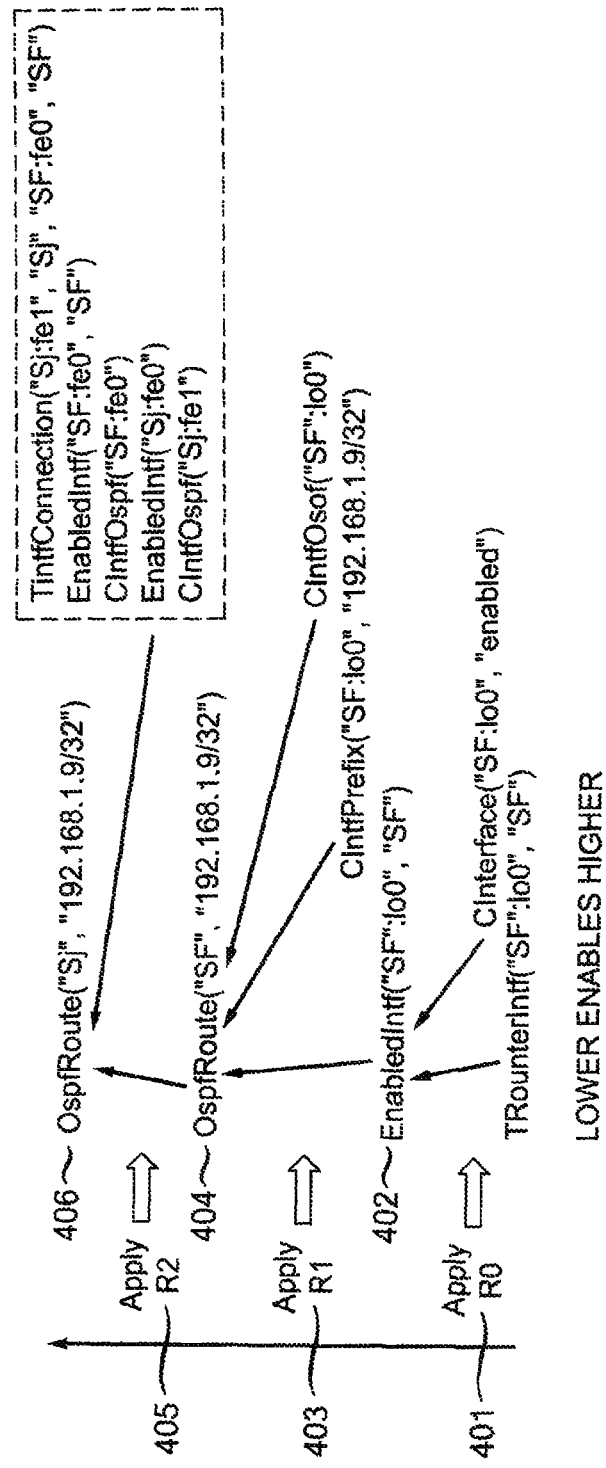
FIG. 4 is a schematic representation of a bottom-up view evaluation of the network of FIG. 3.

To assist in understanding how R0-R2 help build network-wide visibility, FIGS. 3 and 4 illustrate how these rules would be utilized (in bottom-up fashion) to answer the high level query: OspfRoute("SJ","192.168.1.9/32"), i.e., "Is prefix 192.168.1.9/32 in the OSPF RIB (Routing Information data-Base) of router SJ?"

FIG. 3 shows a small network with three routers, SF, at 301, SJ, at 302, and LA at 303. They are connected to each other with two links, 304 and four interfaces, 305. As shown in the FIG key, round interfaces have OSPF configured and diamond interfaces do not. Additionally each router has a loopback interface. As shown in FIG. 3, in this example all interfaces between SF and SJ, as well as their loopback interfaces, are OSPF-enabled (and active), so that the query is true.

FIG. 4 shows how R1 and R2 are evaluated to reach this conclusion. The dotted box aggregates part of the query for brevity. In FIG. 4, at 401 R0 is applied to obtain 402. At 403, R1 is applied to obtain 404. And at 405, R2 is applied to obtain 406, thereby determining that all interfaces between SF and SJ, as well as their loopback interfaces, are OSPF-enabled and active.

Similar to distilling how OSPF works via view OspfRoute defined by R1 and R2, we can further compose rules about dependencies of other protocols and network services in general, such as BGP (Border Gateway Protocol) sessions and VPN (Virtual Private Network) services. In particular, a working iBGP session depends on BGP configuration on both ends of the routers and IGP (Internet Gateway Protocol) reachability (e.g., OSPF as defined in view OspfRoute). A working VPN depends on a signaling mechanism (e.g., an established iBGP session between two PEs), and a transport mechanism (working IGP, MPLS-enabled interfaces, etc.). Both protocol dependencies can be concisely captured in rules.

Views can also be. used in what-if analysis. In such an analysis, the underlying config tables upon which the high level views depend are modified, and the views are examined to see if the changes match expectation. For example, changing the IP address of a loopback interface on an edge router would remove that prefix from other routers' RIB, disconnecting iBGP sessions which depend on correct end-point IP specification. As a result, VPN services that depend on a working iBGP are disrupted. In an embodiment of the disclosed technology, after changing the IP address in the config table, one should notice that the disrupted VPN service entries disappear in the VPN related views.

Misconfiguration Prevention Misconfigurations in complex networks are common and can cause both serious short-term service disruptions and long-term performance degradation. When they occur, it generally takes operators hours or days to troubleshoot. The current best practices followed by operators are mainly from two sources: (i) to prevent general misconfiguration, device vendors provide general guidelines, such as "a router must have a unique router ID," or "a router must have a loopback interface"; and (ii) to prevent service disruption, service providers usually have specific requirements, such as "at least one of the two redundant links must be up," "iBGP sessions must form a mesh," or "all customers' VPN networks must be connected."

An embodiment of the disclosed technology introduces constraints to detect and prevent misconfiguration. The constraints dictate what data should not appear if the database is in a consistent state. This is analogous to the safety property of a system that states that something "bad" should never happen. That is, such an embodiment rejects data update calls, before those changes are propagated to routers, if their outcome would violate given constraints. Constraints exist in traditional relational database management systems ("RDBMS"), but are usually limited to uniqueness of primary keys and referential integrity of foreign keys. In contrast, the disclosed technology allows more expressive constraints that are capable of checking and reasoning about multiple devices at different layers across the network. Specifically, in this embodiment, a constraint is defined the same way as views, by a set of rules. A constraint is satisfied if and only if the associated view is evaluated to an empty list. If a constraint view contains data, it implies that one or more violations of the constraint occur in the network.

In this embodiment, we explicitly differentiate two types of constraints: hard constraints that only depend on data in regular and config tables, but not status tables, and soft constraints that do depend on status tables. This embodiment can enforce hard constraints to prevent misconfigurations. Because both read and write access to regular and config tables are entirely guarded by the controller, this embodiment is able to reject any attempt that would violate hard constraints. Soft constraints are not always enforceable because they depend on status that may change by themselves over time. For example, a soft constraint might be valid at first, but invalid later due to a network outage. In one embodiment, hard constraints are suitable for preferences and eliminating misconfigurations, while soft constraints are used for dynamic responses such as fault detection, diagnosis, and recovery.

Configuration Automation The traditional mindset for configuration management is that operators (i) change the configuration of one or more devices and (ii) check if a network feature. change is affected. These two steps are repeated until the check succeeds. For a failed network check, the operators reason about the symptom and fulfill the missing dependency based on expert knowledge. This process is without question time consuming and error-prone. It would be ideal if operators could manage networks by issuing high-level intention requests, which can be automatically handled without manually touching the low-level details.

In an embodiment of the disclosed technology, we use a new primitive of automating configuration management by allowing writes to view tables. Specifically, this embodiment allows the operators to specify intended network changes as insert/delete/update to view tables. The disclosed technology then automatically identifies a set of low-level changes to config tables that can satisfy the given intention. When multiple solutions are available, they can be ranked based on user provided preferences, or filtered if the changes violate hard constraints. For example, an operator can express goals, like "establish a VPN between interfaces A and B," or "add router C to the iBGP mesh," by inserting tuples to the corresponding views.

Figure 5:
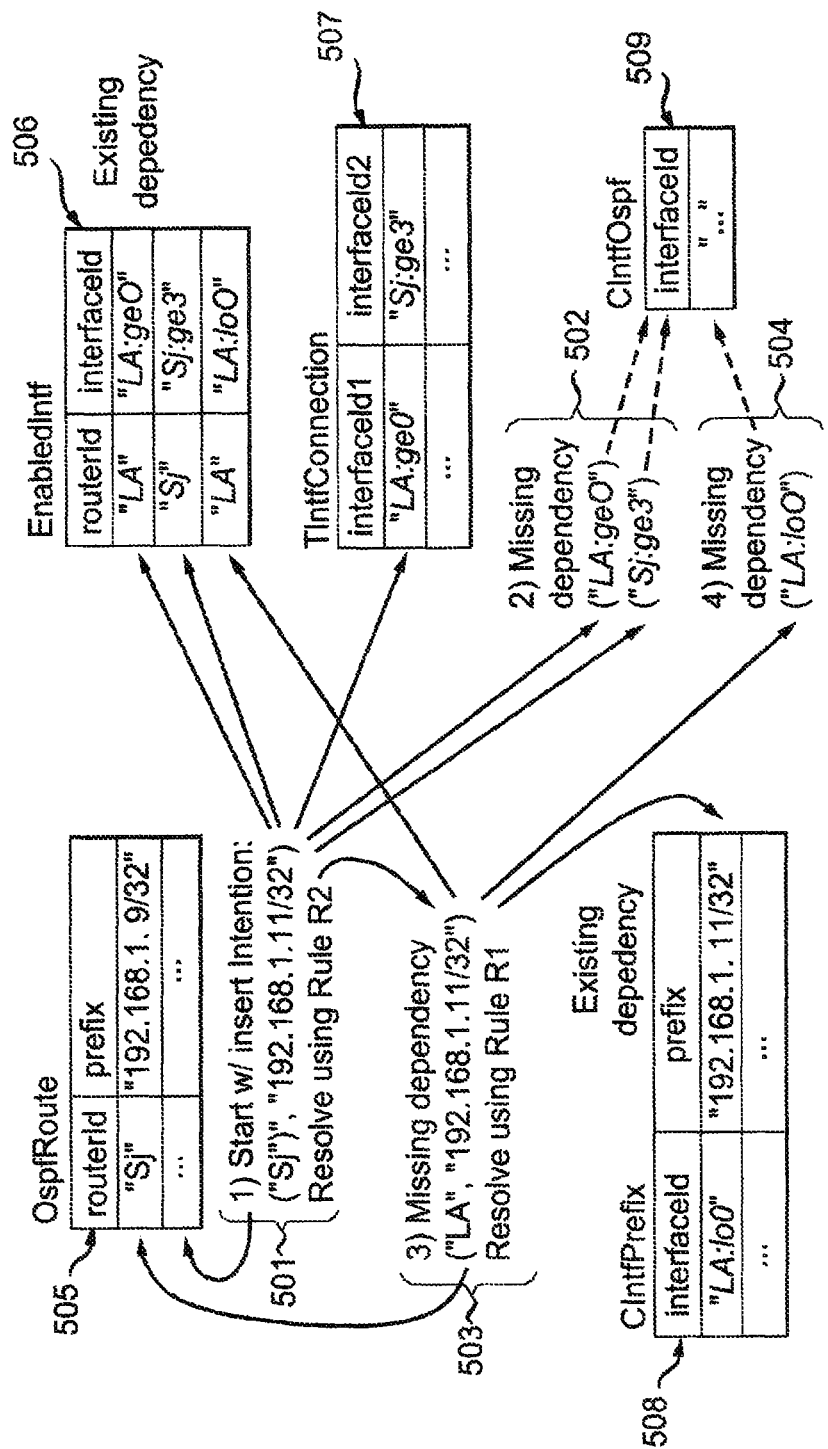
FIG. 5 is a schematic representation of a top-down view update.

Conceptually, a specific embodiment solves view updates through dependency resolution, where the dependencies are defined by the view declarations. For example, given the existing setup shown in FIG. 3, the operator can ask, "How do I make prefix 192.168.1.11/32 reachable via OSPF on router SJ.". FIG. 5 is a schematic representation of an implementation of a top-down view update. As shown at 501 in FIG. 5, this translates into asking "How to insert ("SJ", "192.168.1.11/32") into the OspfRoute view?". At 505, this tuple is missing in the OspfRoute view of FIG. 5. This means that the prefix does not have a way to populate to router SJ. In FIGS. 5, 505, 506, 508 and 509 are tables and views, and 502, 503, and 504 are missing dependencies.

At 501, this embodiment first tries to resolve the dependency based on rule R2. The missing dependent config table entries at 502, 503, and 504 can be added, as long as they do not violate network-wide hard constraints. The missing dependent view table entries are then recursively resolved at 503. The solution to this view insertion is a set of tuples, shown at 502, 503 and 504, to be added into the config tables. The detailed algorithm is described further below. Besides modifying a single entry in a view, a group update of multiple entries to multiple views is also supported for general network operations.

Atomic network operations—Dealing with network and device failures is common in network management, especially in large-scale networks. If not handled properly, they often put the network in an inconsistent state. For example, a sophisticated network operation involving configuring several routers might have to be abandoned midway because of unforeseen circumstances, such as an unexpected network change, or because part of the procedure was unsuccessful. Standard operational procedures would attempt a manual rollback; however, that may be incomplete, leaving some "orphaned" configuration excerpts, which might lead to security holes or unwanted network behavior. Operators are usually reluctant to remove the configurations that serve unknown purposes due to the risk of impacting existing services.

The problem in the above example may be caused by the lack of atomicity in network management primitives. In the disclosed technology, the ACID properties of transactional semantics (atomicity, consistency, isolation, and durability) are articulated as primitives to compose network operations. They are provided naturally in a specific embodiment by the database abstraction. Such an embodiment supports assertions on network-wide states, through checking status tables, to validate transactions.

In this embodiment, a network operation is defined as a series of database read and write commands, from and to the tables and views. The pseudo code shown in FIG. 6 demonstrates the basic usage of the transaction primitive: In FIG. 6, at 601, the setupIp operation is to set up the IP addresses on two interfaces of two routers that are physically connected. At 602, db is a global variable as the connection to the controller. The "with" statement starts an atomic transaction using the current connection. At 603 and 604 are the DB update commands to change the config table CIntfPrefix on the routers. The flush API 605 ensures that the changes are effective in the routers. This is needed for the check at 606, where the status table SPing is checked to verify that the two IP addresses are reachable to each other by ping. If the ping command fails, an AssertionError exception is raised. If there is any exception raised, the transaction is aborted and reverted to the initial state by (implicitly) executing the db.rollback( )API. In the end, this embodiment checks all of the hard constraints. If they are all satisfied, the current transaction is committed at 607. Otherwise a rollback is performed on the transaction.

To this point, we have presented an overview of the framework of a specific embodiment of the disclosed technology. This embodiment builds on a database abstraction that captures all aspects of the network and its operations in a data model, consisting of regular, config, and status tables. The embodiment allows vendors and providers to collaboratively capture domain knowledge in the form of rules, in a declarative query language. By leveraging such knowledge, this embodiment provides new network management primitives to network operators, including network-wide reasoning, misconfiguration prevention, configuration automation, and atomic network operations, all in the same cohesive framework.

Figure 7:
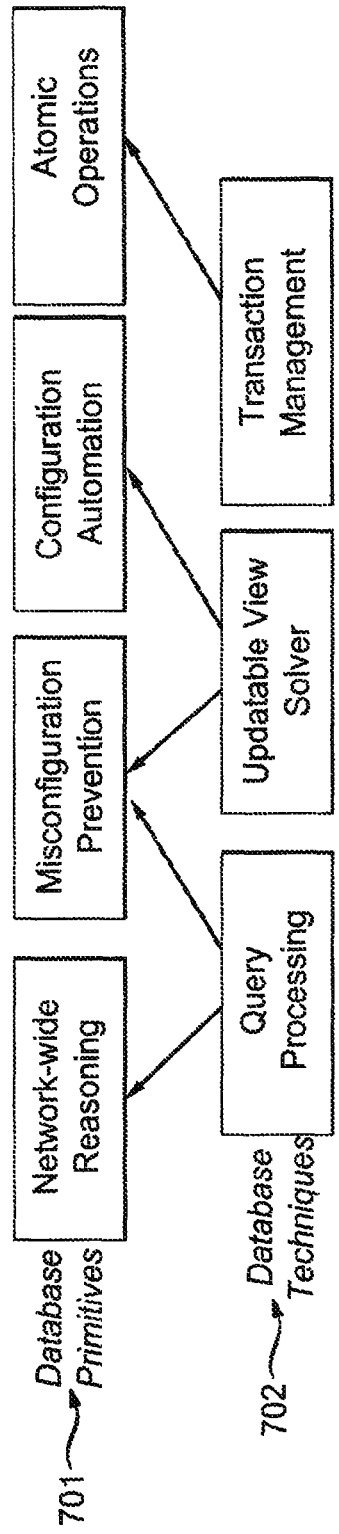
FIG. 7 is a schematic representation of the relationship between primitives and techniques of a specific embodiment of the disclosed technology.

Specific Exemplary Techniques—In what follows, we explain techniques that may be utilized in a specific embodiment to enable the network management primitives described above. FIG. 7 is a schematic representation of the relationships between primitives and techniques in a specific embodiment of the disclosed technology. The techniques at 702 enable the primitives at 701.

Query Processing—Query processing is essential for network-wide reasoning, and misconfiguration prevention. In what follows, a few design choices in building the query processor efficiently are discussed. In this embodiment we make use of recursive queries.

One difference between this embodiment and conventional RDBMSs is the scale of data this embodiment manages. Most RDBMSs assume that the data managed is too big to fit in the main memory of a single machine. This assumption is no longer true, especially in this embodiment, even though it is a distributed database. The scale of regular tables could be very large if we archive all historical network and device status data. However, the scale of config tables where live router configurations are stored is much smaller. If it is assumed that a configuration file is 100 KB on average, and there are on the order of a thousand routers in the managed network (which is the case for large ISPs), then the space needed to store the raw data is on the order of hundreds of megabytes, which is a very modest footprint. This allows the aggressive caching of queries in memory, especially for view-related query optimizations, and avoids complex buffer management mechanisms. Therefore, although config and status tables are distributed, all data is first aggregated in a centralized master node (discussed below) before query evaluation. Centralized processing is also preferred in order to enforce a strong consistency model as opposed to the eventual consistency model. Once all data is available, we apply the semi naive evaluation algorithm to evaluate recursive queries.

In this embodiment, we use caching and incremental update to speed up view evaluation. All views may be lazily evaluated, i.e., the query of a view is only evaluated when the view is referenced in a transaction. The results of executed view queries are cached in memory to speed up further queries on the same view. In this embodiment, we do not cache any view that depends on status tables, e.g., those views for soft constraints. When a config or regular table changes, the new query result is generated by joining and selecting the incremental changes with the cached view, instead of invalidating the cache as a whole. In some cases performance increases by 74 times as a result of this optimization.

Updatable view solver—Presented in the following is an algorithm, which may be used in configuration automation, which resolves high-level network management intentions to the required low-level changes. For input, the algorithm takes a management intention that is expressed as modifications to views, for example, to insert ("SJ","192.168.1.11/32") into OspfRoute view. A solution, to be a set of modifications, is defined to config tables, that when applied, can achieve the intended view modifications. In this embodiment, the algorithm outputs one or more ranked solutions, ordered by user-defined cost functions. A simple cost function can be the number of changes required, thus the best solution is the one with the fewest number of changes.

The algorithm disclosed here uses a breadth-first search that builds on the fact that the view declarations rarely contain negations. This is due to the fact that the functionalities of network devices are mostly cumulative—once a feature (e.g., MPLS) is activated, it is rarely switched off and not likely to negate other features. This implies that if a desired tuple is not in a view table, it can be "inserted" by adding a set of tuples into other base tables, and thus resolve the dependencies described by the view rules. Similarly, to "remove" a tuple from a view table, we can delete certain dependent tuples in the base tables. In this embodiment, we constrain the solution to modifying configuration tables only, because regular tables and status tables are read-only.

The algorithm shown in FIG. 8 outlines how we find all solutions for a group-insert request. This can be easily modified to terminate when the first or $N^{th}$ solution is found. We define a search state, at 801, to be a list of proposed config table inserts (s.action) and unresolved view inserts (s.toResolve). We consider a view insert as unresolved if the intended tuple does not exist when the proposed changes are applied. A solution is found when a state has no unresolved view inserts. Redundant solutions are filtered at 806. For example, if {C1, C2} is already a solution, there is no need to further process (C1,C2,C3). A heap array Q maintains unexplored search states, acting as a priority queue that identifies the states with the lowest cost.

The algorithm starts at 801 with a state with an empty s.action set and a s.toResolve set, i.e., input intentions L. For each search state, unresolved inserts are first verified, at 806 through 812, using view incremental updates at 809, and then an attempt to resolve the unresolved view insertions is made by going through the view rules to identify the missing dependencies at 816. For example, to insert (rId,prefix) into OspfRoute, we can consider using R2 to satisfy the dependency, and we need to recursively insert into CIntfPrefix and CIntfOspf, which becomes part of the action of a new search state, and EnabledIntf, which becomes part of toResolve.

For each rule under consideration, if the variables for the fields of the head view table fully cover the variables used in the body tables (e.g., rule R0), it is known exactly how to change the body tables. If a field of a body table is denoted by a variable not used in the head table, e.g., ifId of rule R1, we call that field unrestricted. It is not feasible to enumerate all possible values for those fields. As illustrated in FIG. 8, we apply a restriction propagation strategy iteratively until all fields of the body tables are restricted.

Figure 9:
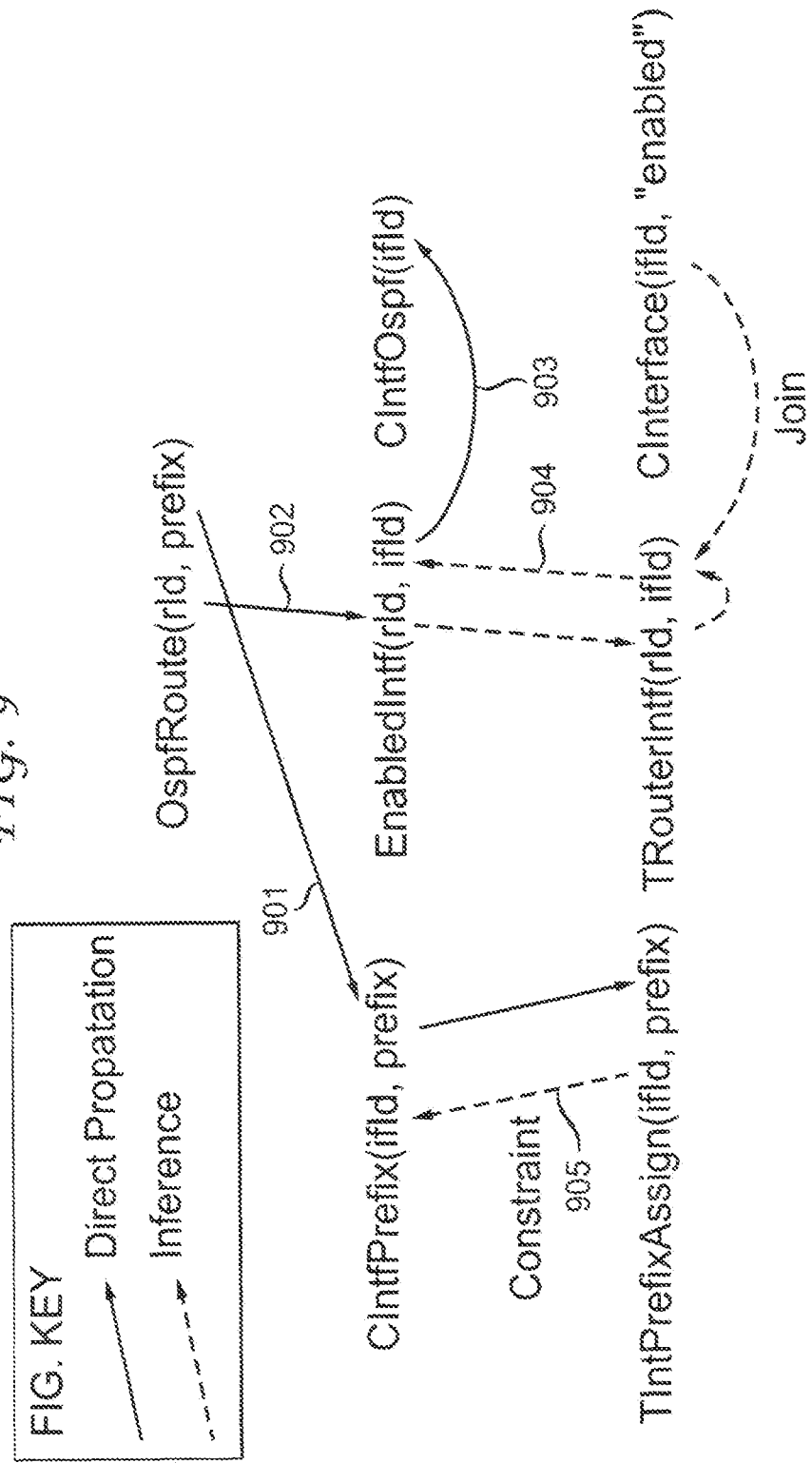
FIG. 9 is a schematic representation of constraint propagation.

Direct Propagation Based on Variable Names: Once we restrict a field for one table, all the fields of other tables denoted by the same variable name can be restricted. FIG. 9 is a schematic representation of constraint propagation. For example, rId and prefix in OspfRoute are fixed as part of the view update intention, and can be populated to the fields of CIntfPrefix and EnabledIntf, illustrated by arrows 901 and 902 in FIG. 9. Also, once we restrict the ifId field of EnabledIntf(ifId,rId), the ifId field of CInffOspf can be restricted at 903.

Domain Inference Based on Regular Tables and Constraints: Fixed regular tables are used to determine the value domain of view table fields. For example, as defined in R0, the ifId field of EnabledIntf comes from TRouterIntf, so the domain of that field is restricted by the data in table TRouterIntf at 904 in FIG. 9. Also, a constraint on CIntfPrefix by TIntfPrefixAssignment also restricts the domain of ifId field of CIntfPrefix at 905 in FIG. 9.

We take the intersection of all restrictions to decide on the trial values for each table field. If the intersection ends up an empty set, it means this insertion attempt cannot be fulfilled. If a field cannot be constrained, it means that this embodiment cannot decide how to configure the corresponding table. At this point either the query can fail or the query can ask the operator for additional input. In this embodiment, the provisioning database, with necessary constraints specified, may cover all of the necessary information regarding configuration.

When all fields are restricted, we take a cross-product of the variable value domains and generate new states based on those variable combinations. New states are filtered out 819 in FIG. 8 if hard constraints are violated. For example, a constraint may state that running more than N BGP sessions on a type of router is undesirable, thus a BGP configuration change can be rejected. In this specific embodiment, provisioning data may be used for generating a firewall policy or setting up the hop number for an eBGP session.

A similar algorithm is used for view deletion by breaking the dependency of satisfied view tuples. A solution that removes a specified tuple from a view table must not i) remove certain tuples, such as a previously inserted view entry, from the view table as a side-effect; ii) violate hard constraints. While constraints are already specified, the set of tuples that should not change in the view tables needs to be entered. To remove a tuple from a view, we identify the rules that derive that tuple and recursively remove tuples from body tables. For each proposed config table tuple removal, an incremental update is used to evaluate if any constraints are violated.

Transaction Management—Misconfiguration prevention and atomic network operations both rely on the transaction processing capability of the disclosed technology. A more formal description of the transactional semantics and the design choices made to handle transactions are described below.

In the context of databases, a single logical operation on the data is called a transaction. Atomicity, consistency, isolation, and durability (ACID) are the key properties that guarantee that database transactions are processed reliably. In this embodiment, a network operational task is naturally expressed as a distributed database transaction that may span across multiple physical devices. In a specific embodiment of our data model, the regular tables inherit the exact ACID properties from a traditional RDBMS; transactional semantics do not apply to status tables due to their read-only, volatile nature, and, most interestingly, we find that ACID properties naturally fit config tables as discussed below.

Atomicity: The configuration changes in an atomic operation must follow an "all-or-nothing" rule: either all of the changes in a transaction are performed or none are. This embodiment aborts a transaction if failure is detected, and rolls back to the state before the transaction started. Note that atomicity also applies in a distributed transaction where config changes involve multiple devices. The atomic feature greatly simplifies the management logic in handling device and other unexpected failures.

Consistency: The database remains in a consistent state before the start of the transaction and after the transaction terminates regardless of its outcome. The consistency definition in this embodiment is that all hard constraints must be satisfied. Before each commit in a transaction, this embodiment checks all hard constraints and aborts the transaction if any of them are violated. The consistency guarantee is essentially the enforcement mechanism to prevent misconfigurations.

Isolation: Two concurrent network operations should not interfere with each other in any way, i.e., as if both transactions had executed serially, one after the other. This is analogous to the serializable isolation level in a traditional RDBMS. For example, an operation in an enterprise network might be to allocate an unused VLAN in the network. Two of such concurrent operations without isolation might choose the same VLAN ID because they share the same allocation algorithm. Such a result is problematic and can lead to security breach or subtle configuration bugs. This embodiment provides automatic transaction isolation guarantees to prevent such issues.

Durability: Once the user has been notified of the success of a transaction commit, the configurations are already effective in the routers. Most commodity routers already provide this property. However, we note that this embodiment is different from the definition in a traditional RDBMS, where data flushed to a transaction log on disk is considered durable and table entries are not necessarily updated. To implement the ACID transactional semantics in this embodiment, we use the Two-Phase Commit protocol for atomicity due to its simplicity and efficiency; we use concurrency control.

These design decisions are customized for network management purposes. For example, conservative, pessimistic, lock-based, concurrency control may be preferable because concurrent network management operations occur much less frequently than typical online transaction processing (OLTP) workload, such as online banking and ticket booking websites. Once two concurrent network operations have made conflicting configuration changes, it is very expensive to roll back and retry one of them. We choose to avoid conflicts from happening, even at the cost of limiting parallelism. We discuss the detailed implementations of transaction management below.

Specific Embodiments

In this section we present three specific embodiments. First, we describe the use of this embodiment for the creation of Virtual Private LAN Service (VPLS), a layer-2 virtual private network. This exemplifies the type of rule set an equipment vendor might provide to capture device and protocol dependencies. In the second example, we use features of a dynamic networking test bed as an example of services that a service provider might build on top of such vendor-provided rules. In the final example, we show how to use soft constraints in rules for fault diagnosis.

Configuring VPLS—VPLS leverages an MPLS backbone to provide Ethernetlike layer-2 connectivity to different customer locations. Configuring VPLS is very involved due to complex dependencies and options. Instead of reading hundreds of pages of configuration documents and then performing manual configurations, operators can use this specific embodiment to configure VPLS with a single view insert operation.

The dependencies involved to enable VPLS service are particularly complicated. The provider edge routers must configure (i) iBGP or the Label Distribution Protocol (LDP) for VPLS signaling, (ii) LDP or the Resource ReSerVation Protocol (RSVP) for the creation of Label-Switched Paths (LSPs) between PEs, (iii) VPLS routing instance and VPLS-capable interfaces. Implicitly, an MPLS backbone is assumed to have IGP enabled.

Dynamic Network Testbeds—Network testbeds require very dynamic network configuration tasks as experimental slices are created and destroyed. This is a task that is readily achievable within the framework of the disclosed technology. SNet is an existing testbed which emulates an MPLS backbone network and allows for testing and experimentation by creating slices consisting of routers, switches and machines. Here we focus on establishing connectivity, i.e., adding a virtual link between virtual devices in SNet, to illustrate how this embodiment of the disclosed technology can be utilized to simplify network functionality management.

Figure 11:
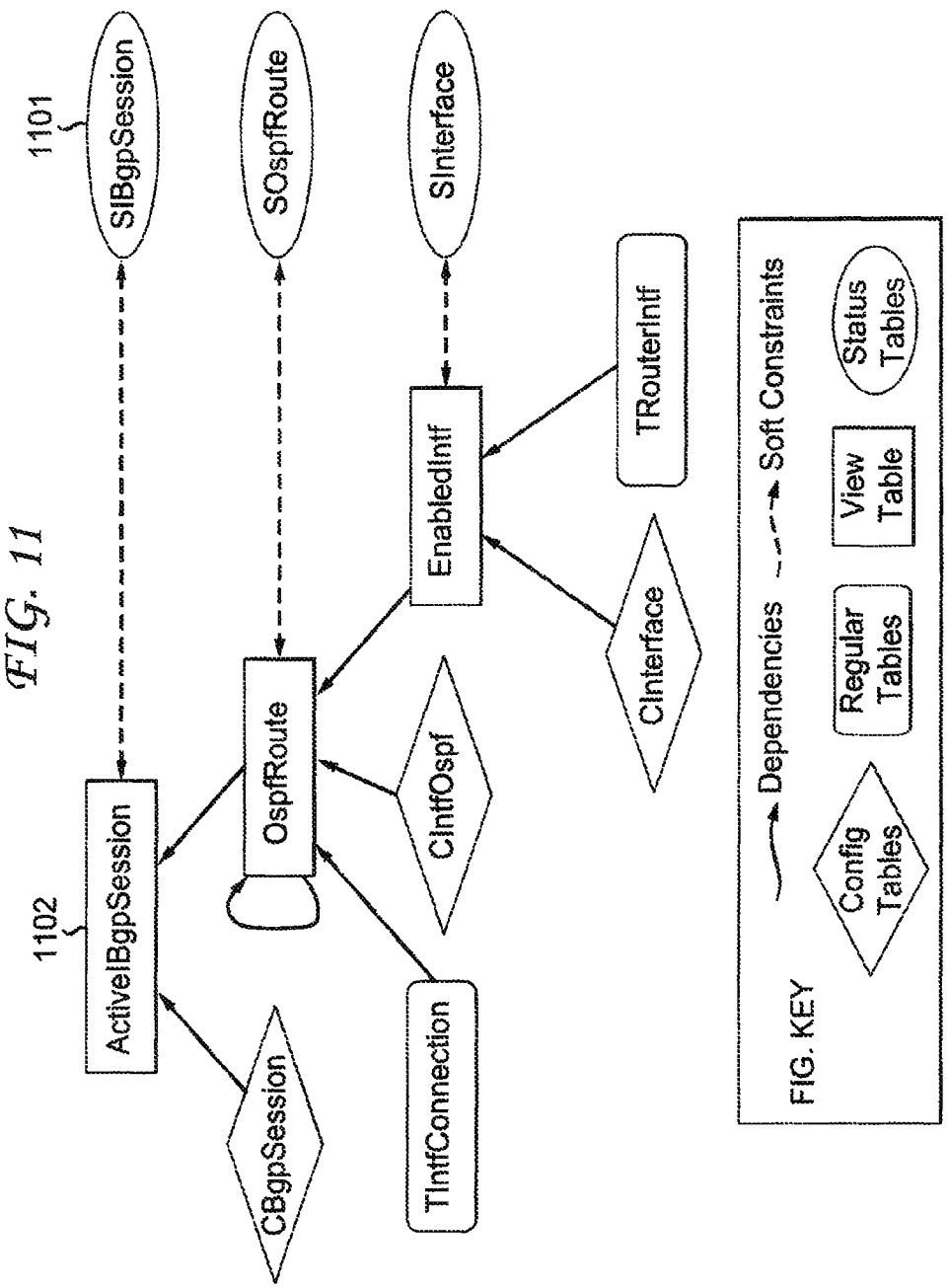
FIG. 11 is an exemplary representation of fault diagnosis in accordance with an aspect of the disclosed technology.

SNet controller allows adding and removing logical links between two logical devices (e.g., virtual machines or logical routers). If two logical devices are on physical devices of the same location, they are connected using a dedicated local VLAN. If two logical devices are not at the same location, the controller connects them using VPLS. Assuming vendors provide rules regarding VPLS and VLAN configuration, as shown in FIG. 11, we only have to write two simple rules to handle these situations.

FIG. 10 is an exemplary representation of rules for connectivity establishment in SNet. This embodiment of the disclosed technology simplifies SNet controller design. In particular, SNet logic link operations are handled by inserting and deleting on view SNLink, defined by rules RS1 and RS2 at 1001 and 1002 in FIG. 10, respectively. They start from two logical devices lrId1 and lrId2, identify their corresponding physical devices rId1 and rId2, and further compare the locations of the two physical devices. If they are on different SNet locations (loc1!=loc2 as in RS1), then view ActiveVplsLink, which is derived from the vendor rules, is used for creating the connectivity between the two logical routers. Conversely, view ActVlanLink is used, as in RS2, to establish a VLAN channel. The disclosed technology not only automates network device management, but also simplifies the construction of complicated network applications.

Fault Diagnosis - The disclosed technology allows a new and disciplined paradigm of fault diagnosis, due to the strong ties among network functionality, configuration and running status, established by the declarative rules. In this embodiment, views can be used to represent how the network should behave given the list of devices and their configurations. Typical examples include prefixes propagated via OSPF, enabled BGP sessions, and established MPLS label switching paths.

In this embodiment, the actual state of these functionalities is abstracted as status tables. In most cases, the status information is meant to reveal the state of network protocols and functionalities. In this embodiment, we can specify the tie between a view table and a status table as soft constraints.

FIG. 11 is a schematic representation of fault diagnosis in accordance with the disclosed technology. As shown in the FIG key, diamond shapes are config tables, rectangles are view tables, rounded rectangles are regular tables, ovals are status tables solid lines are dependencies and broken lines are soft constraints. In FIG. 11, status table SIBgpSession, at 1101, and view ActiveIBgpSession, at 1102, are tied using a soft constraint. It is violated if there exists an iBGP session that should be established according to ActiveIBgpSession, but actually broken based on SIBgpSession.

The inherent dependencies across different views can help us iteratively drill down to the root cause of a problem. For example, as shown in FIG. 11, view ActiveIBgpSession depends on corresponding entries in OspfRoute to ensure IGP connectivity, while those route entries in OspfRoute may further depend on entries in EnabledIntf. A discrepancy between ActiveIBgpSession and SBgpSession may be explained by a missing route in SOspfRoute, and further boils down to a broken interface that causes it. This procedure is generic across network diagnoses which involve protocol dependencies. It can be easily automated, as opposed to having operators manually follow a diverse set of diagnosis procedures.

Implementation

Figure 12:
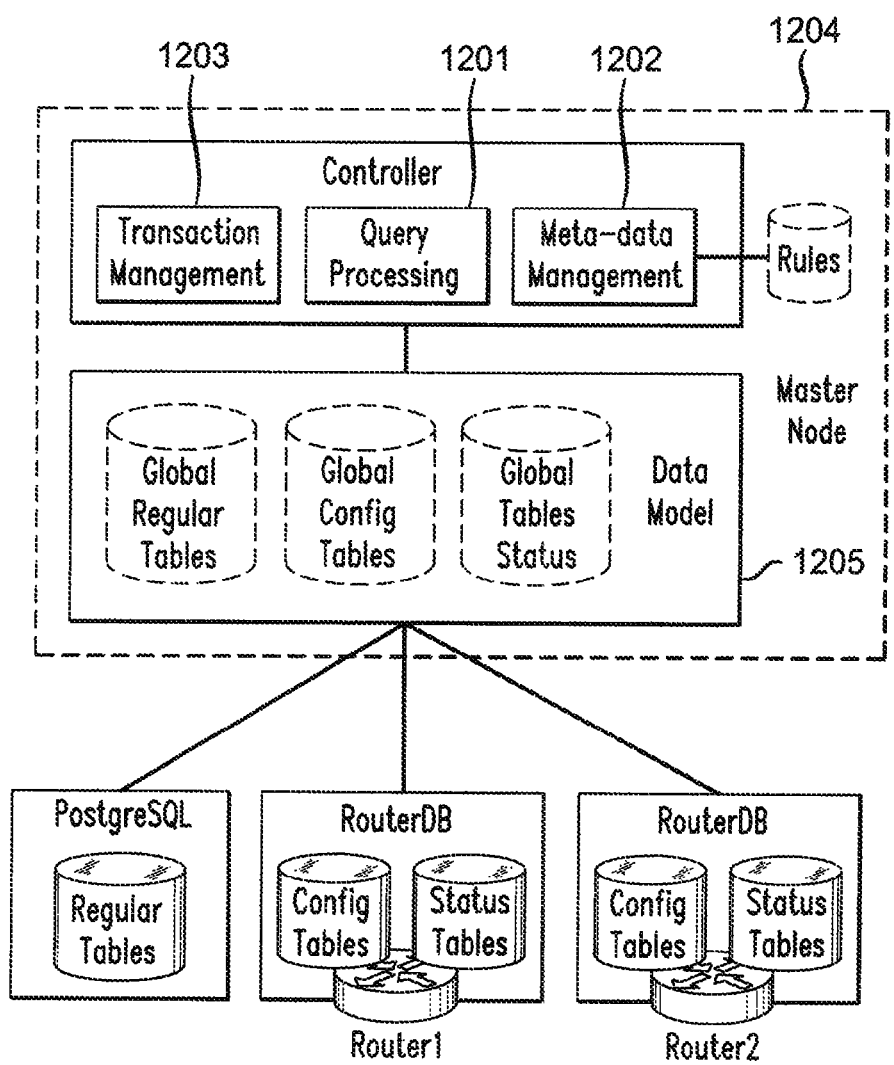
FIG. 12 is a schematic representation of the overall system architecture of a specific embodiment of the disclosed technology.

A schematic representation of the overall system architecture of a specific embodiment of the disclosed technology is shown in FIG. 12. A prototype system may be implemented in roughly 13 k lines of Python™ code, resulting in two major software artifacts: (i) each RouterDB instance interacts with a router and exposes its configuration and status as tables; (ii) master node aggregates all tables into a logically centralized data model, allowing the controller to perform query processing and transaction management based on the given rules.

Master Node—In FIG. 12, 1204 is the master node where queries and operations occur. The master node in this embodiment is a centralized database manager that unifies all data sources in the data model at 1205, as shown. PostgreSQL™ may be used as the backend to manage all regular tables. Each physical router may be managed by a RouterDB instance, which exports the corresponding config tables and status tables. The config tables on RouterDBs are aggressively combined and cached on the master node for performance improvement. When an entry in a config table is modified, the appropriate RouterDB instance will be identified and notified based on the primary key of the entry, which has the physical router ID encoded. This technique is known as horizontal partitioning in data management. In this embodiment the controller on the master node has the following three major components:

Query processing: At 1201, the query processor first parses the declarative rules and rewrites them in expressions of relational algebra (set-based operations and relational operators such as join, selection and projection). A library may be implemented in Python, with a usage pattern similar to Language INtegrated Query™ (LINQ) in the Microsoft .NET framework to express and evaluate those relational expressions. The library is capable of integrating queries from Python objects, tables in PostgreSQL by an object relational mapper and XML data. The algorithm described above under "Query Processing" may be implemented for query evaluation and view maintenance.

Meta-data management: Meta-data, such as the definitions of all tables, views and constraints, may be managed, at 1202 in the format of tables as well. In particular, the controller manages the meta-data by keeping track of the dependencies between the views, which is used by the view maintenance algorithm, discussed above, for caching and incremental updates.

Transaction Management: In this embodiment, the master node may serve as a distributed transaction coordinator, and passes data records to and from the underlying local database engines at 1203. It need not handle any data storage directly, and achieves the transactional ACID properties as follows:

Atomicity and durability are achieved by realizing the two-phase commit protocol (2PC) among the underlying database participants (i.e., PostgreSQL and RouterDB instances: In phase 1, the master node asks all of the participants to prepare to commit. The transaction aborts if any participant responds negatively or fails to reply in time. Otherwise, in phase 2, the master node flushes the commit decision to a log on disk, then asks all nodes to commit:

Consistency is enforced by checking all hard constraints after the commit request is received. If any hard constraint is not satisfied, the transaction is aborted. Otherwise, the 2PC protocol is started to complete the transaction.

Isolation is enforced by a global lock among transactions in the current prototype. Effectively, this only allows a single transaction at a time—the most conservative scheme. While it clearly limits the parallelism in the system, it is acceptable because network operations are not frequent enough to overlap in most cases, even in large networks. Using finer-grained locks for higher parallelism could introduce distributed deadlocks, which could be costly to resolve.

To recover from a crash of the master node, the transaction manager examines the log recorded by the 2PC protocol. It will inform the participants to abort pending transactions without commit marks, and recommit the rest. If the master node cannot be restarted, it is still possible for network operators to directly interact with individual RouterDBs. This allows raw access and control over the network for emergency and manual recovery.

Figure 13:
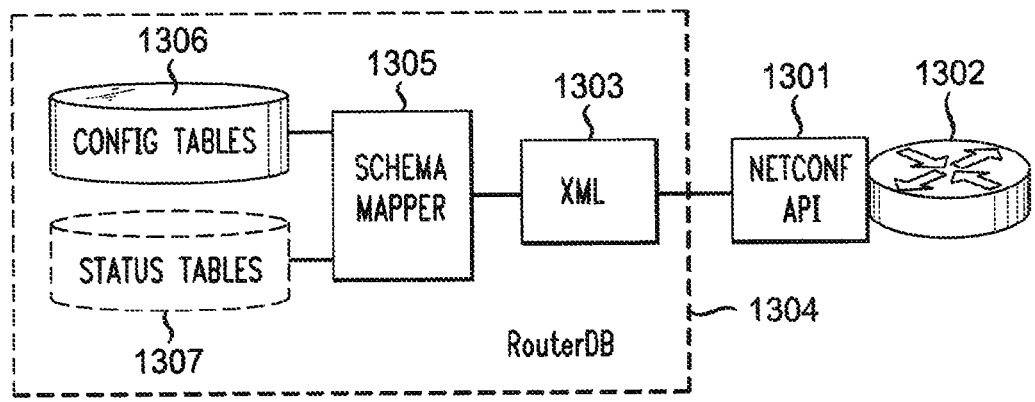
FIG. 13 is a schematic representation of router db implementation.

RouterDB—FIG. 13 is a schematic representation of an implementation of RouterDB. RouterDB, at 1304, provides a 2PC-compliant transactional database management interface for a single router device. This specific embodiment works with Juniper™ routers, but it can be easily extended to other router types. RouterDB utilizes the programmable APIs standardized by the Network Configuration Protocol (NETCONF) to install, manipulate, and delete the configuration of network devices over XML.

When a RouterDB instance starts, it uses a given credential to initiate a NETCONF session, at 1301, over ssh with the corresponding router, at 1302, and fetches the currently running configuration in XML format, at 1303. Then a schema mapper, at 1305, is used to convert configurations from the tree-structured XML format into relational config tables, at 1306. All the config tables are stored in memory for efficiency.

Transaction APIs: To update config tables, a transaction may be started by calling the begin txn RouterDB API. It saves a snapshot of the current configuration in XML, and returns a transaction context ID. Further data manipulation operation calls, such as insert, update, delete to the config tables must use the ID to indicate its transaction affiliation. Once a manipulation call is received, the schema mapper converts it back to an XML manipulation snippet, and uses the edit-config NETCONF API to change the configuration on the router. This change is made to a separate target, called the candidate target, so that it does not interfere with the running configuration of the router. Then, the updated configuration in the candidate target is fetched, and the change is propagated to the config tables via the schema mapper.

RouterDB provides a flush API to allow operators to precisely control when a configuration change is effective on the router within a transaction. When called, a commit NETCONF call is issued so that the router copies the configuration from the candidate target to the running target to make it effective.

To be compliant with the two-phase commit protocol used by the master node, RouterDB implements the prepare, commit, and rollback APIs. When executing prepare ( ) the configuration in the candidate target is validated by the router. An invalidated configuration will raise an exception so that the transaction will be aborted. During commit( ) the configuration .in the candidate target is first made effective as in flush( ) and then the saved snapshots are freed. During rollback( ) if the transaction has never been flushed, the candidate target is simply discarded on the router. Otherwise, RouterDB uploads the snapshot saved at the beginning of the transaction and flushes it to the router to revert to the original state.

Handling status tables: Handling operations on status tables is simpler than on config tables. Because status tables are read-only and volatile, they do not interact with any transaction. Each query on a status table is translated into the corresponding NETCONF API call in XML. The response from the router is converted back to the table tuple format, and returned to the master node.

A status table, at 1307, may be implemented by populating it on demand when queried. This strategy works best when status acquisitions are relatively fast and not very frequent. There are two alternative design choices: (i) A RouterDB periodically populates the status tables in the background, e.g., every five minutes, and returns the most recent data when queried. This results in a short and constant query time (no waiting on the device), but potentially stale data. (ii) The physical routers set up triggers that push certain status changes to RouterDB. This function is supported on some commercial routers. It gives good data fidelity, but incurs additional traffic and overhead when the status information is not needed.

Placement: Technically, a RouterDB instance might be hosted anywhere between the master node and the router. In this specific embodiment RouterDB is placed close to the router and it is assumed that the node has reliable network access to the dedicated management interfaces on the managed router. The placement is advantageous over hosting RouterDB on the physical router itself because (i) Data processing on RouterDB is isolated from other tasks on the router, and it is guaranteed not to compete for router resources (e.g., CPU and memory); (ii) When RouterDB is separated from the router, it is much more likely to differentiate failures between RouterDB and the physical router from the master node, and treat them differently; (iii) Only selected high-end commercial routers provide enough programmability to build RouterDB. On the other hand, by placing RouterDB close to the router instead of the master node, we have the opportunity to reduce the amount of data transferred from RouterDB to the master node, by pushing some database operators, such as filters, into RouterDB.

Handling failures: In this embodiment, following the Write-Ahead-Log protocol, RouterDB records every operation in a log file on persistent storage. When recovering from a previous crash, RouterDB locates all ongoing transactions at the time of crash, rolls back the ones that are not committed, and recommits those transactions that the master node has issued commit commands. During the downtime of a RouterDB instance, the master node still has the configuration data in its cache so that it is readable. However, any write requests will be denied. The data in corresponding status tables become unavailable too. Physical router failures detected by RouterDB are reported to the master node, which temporarily marks the related entries in the regular table caches as "offline" so that they do not show up in query results, until the physical router comes back online. Operators cannot change configuration or check status on the router during the offline time.

Figure 14:
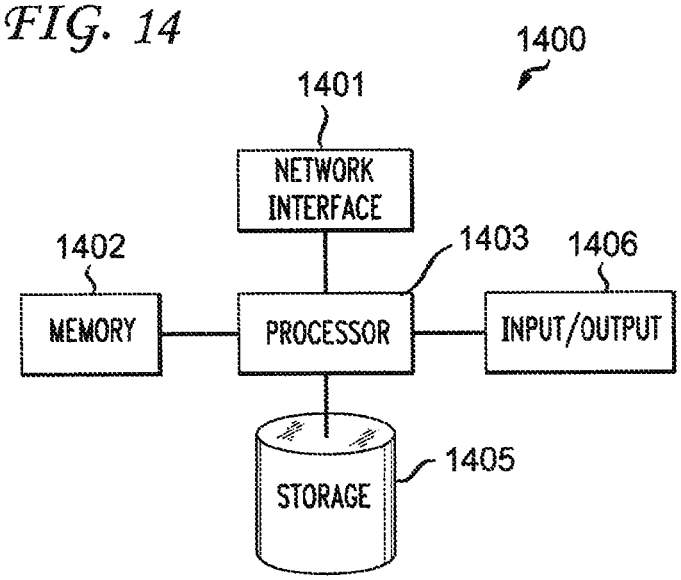
FIG. 14 is a high-level block diagram of a computer that may be used to implement the disclosed technology.

FIG. 14 is a high-level block diagram of a computer that may be used to carry out the disclosed technology. Computer 1400 contains a processor 1403 that controls the overall operation of the computer by executing computer program instructions which define such operation. The computer program instructions may be stored in a storage device 1405 (e.g., magnetic disk, database) and loaded into memory 1402 when execution of the computer program instructions is desired. Thus, the computer operation will be defined by computer program instructions stored in memory 1402 and/or storage 1405, and the computer will be controlled by processor 1403 executing the computer program instructions. Computer 1400 also includes one or more output network interfaces 1401 for communicating with other devices. Computer 1400 also includes input/output 1404 representing devices which allow for user interaction with the computer 1400 (e.g., display, keyboard, mouse, speakers, buttons, etc.). One skilled in the art will recognize that an implementation of an actual computer will contain other components as well, and that FIG. 14 is a high level representation of some of the components of such a computer for illustrative purposes. It should also be understood by one skilled in the art that the method of the current disclosed technology may be implemented on a device such as is shown in FIG. 14 by, for example, utilizing appropriate computer instructions as described herein.

It will be understood by those having ordinary skill in this art that computer instructions to implement the disclosed technology on a computer may be encoded on a computer readable medium for later execution. The term computer readable storage medium encompasses many forms known to those of ordinary skill in this art. In alternative embodiments, the term computer readable storage medium includes non-transitory media such as physical or tangible storage media exemplified by EPROMs, CDs, DVDs or other physical storage media.

Figure 15:
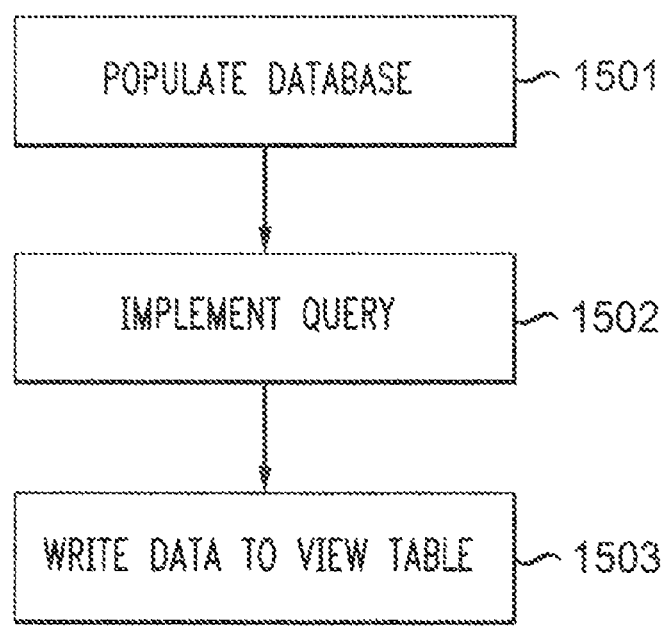
FIG. 15 is a schematic representation of a methodology in accordance with the disclosed technology.

FIG. 15 is a schematic representation of a methodology for operating a network in accordance with the disclosed technology. In FIG. 15, at 1501, relational database is populated with data representing characteristics associated with components of the network. At 1502, a database query is implemented to define a view table, and, at 1503, data, representative of a change in a characteristic associated with a component of the network, is written to the view table. In alternative embodiments, the change is transmitted to the component, thereby effecting the change. In other embodiments a database query is implemented to define network constraints and determining from the database that the change is consistent with the constraints. In other embodiments, the data may be written to recursive views, The disclosed technology is amenable to a variety of partial deployment scenarios. For example, the declarative rule-based approach could be utilized by more conventional network configuration systems. Further, while network-wide deployment of the disclosed technology would provide the most benefit, a partial deployment, e.g., when introducing a new network service, is also feasible. To incrementally deploy this embodiment on a router, one might, for example, start a RouterDB instance that controls the router, and attach the instance to the master node.

In the centralized implementation, the system may not available when the master node is offline. Accordingly, in alternative embodiments, a replicated state machine approach may be used where multiple copies of the controller are running simultaneously as primary node and backup nodes. Another alternative is to adopt a fully decentralized architecture, where all query processing and transaction management is handled in a distributed fashion by RouterDB instances. There are sophisticated algorithms and protocols, such as Paxos commit, that are applicable to this scenario.

With regard to the disclosed technology, it should be noted that routing protocols are usually not transaction-aware, as they require time to converge upon configuration changes. The order and timing of such changes are important in determining the consequences, e.g., temporary routing loops and route oscillations. Therefore, transaction rollback support for handling failures in such tasks is usually inadequate without creating case-specific handlers to deal with failure exceptions. Additionally, it is possible that some resources may be released during the transaction execution and cannot be reacquired in the case of rollback. This could be addressed through a locking mechanism to hold the resources until the transaction finishes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiment of the disclosed technology shown and described herein are only illustrative of the principles of the claimed invention and that various modifications may be implemented by those skilled in the art without departing from the scope and spirit of the invention. Those skilled in the art could implement various other feature combinations without departing from the scope and spirit of the invention. Accordingly, it should be understood that the claimed invention may be broader than any given embodiment described in this specification, or, than all of the embodiments when viewed together. Rather these embodiments are meant to describe aspects of the disclosed technology, not necessarily the specific scope of any given claim.

The invention claimed is:

1. A method, comprising:
   populating cells in a relational database with network configuration data, each cell containing the network configuration data for one router in a communications network;
   receiving, at a configuration server, a configuration query specifying the one router in the communications network;
   querying the relational database for the one router specified in the database query;
   retrieving, from memory of the configuration server, a rule associated with the one router, the rule expressed as a list of enabled interfaces in the communications network and a router inventory of routers in the communications network;
   determining a prefix of an Internet Protocol address assigned to the one router exists in response to the one router being matched to both the list of enabled interfaces and to the router inventory of routers;
   deriving a view table by applying the rule; and
   sending the view table to the one router as a response to the configuration query.

2. The method of claim 1, further comprising writing a change to one of the cells in the relational database.

3. The method of claim 1, further comprising transmitting the change to the physical component.

4. The method of claim 1, further comprising changing the configuration data of the one router.

5. The method of claim 1, further comprising:
   determining the one router is directly connected to a second router in the communications network;
   determining both the one router and the second router are administratively enabled from the list of enabled interfaces;
   determining both the one router and the second router are configured as open shortest path first; and
   propagating a route from the one router to the second router in response.

6. The method of claim 1 wherein the relational database is a centralized database.

7. The method of claim 1, further comprising:
   retrieving a constraint associated with the one router;
   applying the constraint to a configuration change to the one router;
   receiving an empty list in response to application of the constraint;
   determining satisfaction of the constraint in response to the empty list; and
   propagating the configuration change to another router in response to the empty list.

8. The method of claim 1, further comprising:
   retrieving a constraint associated with the one router;
   applying the constraint to a configuration change to the one router;
   determining the view table contains data in response to application of the constraint;
   determining violation of the constraint in response to the data in the view table; and
   rejecting propagation of the configuration change to another router in response to the violation.

9. A system, comprising:
   a processor; and
   memory storing code that when executed causes the processor to perform operations, the operations comprising:
   storing router configuration data in cells of a relational database, each cell containing the router configuration data for a router in a communications network;
   receiving a configuration query specifying the router in the communications network;
   querying the relational database for the router specified in the database query;
   retrieving, from memory of the configuration server, a rule associated with the router, the rule expressed as a list of enabled interfaces in the communications network and a router inventory of routers in the communications network;
   determining a prefix of an Internet Protocol address assigned to the router exists in response to the router being matched to both the list of enabled interfaces and to the router inventory of routers;
   determining a direct connection between the router and a second router in the communications network;
   determining both the router and the second router are administratively enabled from the list of enabled interfaces;
   determining both the router and the second router are configured as open shortest path first; and
   propagating a route from the router to the second router in response to the query.

10. The system according to claim 9, wherein the operations of further comprise:
    retrieving a constraint associated with the router;
    applying the constraint to a configuration change to the router;

determining the view table contains data in response to application of the constraint;

determining violation of the constraint in response to the data in the view table; and rejecting propagation of the configuration change to another router in response to the violation.

11. A memory storing processor executable code that when executed causes a processor to perform operations, the operations comprising:

storing router configuration data in cells of a relational database, each cell containing the router configuration data for a router in a communications network;

receiving a configuration query specifying the router in the communications network;

querying the relational database for the router specified in the database query;

retrieving a rule associated with the router, the rule expressed as a list of enabled interfaces in the communications network and a router inventory of routers in the communications network;

determining a prefix of an Internet Protocol address assigned to the router exists in response to the router being matched to both the list of enabled interfaces and to the router inventory of routers;

determining a direct connection between the router and a second router in the communications network;

determining both the router and the second router are administratively enabled from the list of enabled interfaces;

determining both the router and the second router are configured as open shortest path first;

deriving a view table by applying the rule;

retrieving a constraint associated with the router;

applying the constraint to a configuration change to the router;

determining the view table contains data in response to application of the constraint;

determining violation of the constraint in response to the data in the view table; and rejecting propagation of the configuration change to the second router in response to the violation.

* * * * *